(12) United States Patent
Palatov et al.

(10) Patent No.: US 12,106,668 B2
(45) Date of Patent: Oct. 1, 2024

(54) SELECTIVE MESSAGE RETRANSMISSION IN VEHICLE-VEHICLE COMMUNICATIONS

(71) Applicant: Palatov Group LLC, Portland, OR (US)

(72) Inventors: Dennis Palatov, Portland, OR (US); Marc Ganouna, Beverly Hills, CA (US)

(73) Assignee: Palatov Group LLC, Portland, OR (US)

(*) Notice: Subject to any disclaimer, the term of this patent is extended or adjusted under 35 U.S.C. 154(b) by 30 days.

(21) Appl. No.: 17/423,891

(22) PCT Filed: Feb. 10, 2020

(86) PCT No.: PCT/IB2020/051017
§ 371 (c)(1),
(2) Date: Jul. 18, 2021

(87) PCT Pub. No.: WO2020/165727
PCT Pub. Date: Aug. 20, 2020

(65) Prior Publication Data
US 2022/0122459 A1     Apr. 21, 2022

(30) Foreign Application Priority Data

Feb. 12, 2019   (FR) ..................................... 19 01398

(51) Int. Cl.
*G08G 1/16* (2006.01)
*B60R 16/023* (2006.01)
(Continued)

(52) U.S. Cl.
CPC ........... *G08G 1/162* (2013.01); *B60R 16/023* (2013.01); *H04L 1/08* (2013.01); *H04W 4/46* (2018.02)

(58) Field of Classification Search
CPC ...... G08G 1/162; G08G 1/166; B60R 16/023; H04L 1/08; H04L 67/12; H04W 4/46;
(Continued)

(56) References Cited

U.S. PATENT DOCUMENTS 8,352,112 B2 * 1/2013 Mudalige ............... G08G 1/163
342/458
10,098,014 B1 * 10/2018 Shimizu .................. H04W 4/80
(Continued)

FOREIGN PATENT DOCUMENTS

| EP | 2 309 473 A1 | 4/2011 |
| WO | 2007/026279 A1 | 3/2007 |
| WO | 2010/045966 A1 | 4/2010 |

*Primary Examiner* — Hirdepal Singh
(74) *Attorney, Agent, or Firm* — Mohr Intellectual Property Law Solutions, PC (57) ABSTRACT

A method of distributing intention signaling messages for a vehicle. The vehicle having a plurality of directional radio antennas oriented to transmit radio signals in predetermined and distinct directions. Responsive to the intended change in the vehicle motion, at least one of a plurality of directional radio antennas is selected. The selected directional radio antenna facing in the direction of surrounding traffic which would be affected by the intended change in motion is selected. An intention signaling message is formed and transmitted. The intention signaling message corresponds to the intended change in the vehicle motion by means of the selected directional radio antenna.

16 Claims, 5 Drawing Sheets

(51) Int. Cl.
*H04L 1/08* (2006.01)
*H04W 4/46* (2018.01)

(58) Field of Classification Search
CPC ...... H04W 4/027; H04W 4/12; H01Q 1/3208; H01Q 21/28; H04B 7/0608; H04B 7/0695
USPC ........................................................ 340/902
See application file for complete search history.

(56) References Cited

U.S. PATENT DOCUMENTS

| | | | |
|---|---|---|---|
| 10,455,540 B2* | 10/2019 | Balappanavar | H04W 4/44 |
| 2017/0117628 A1* | 4/2017 | Banasky | H01Q 3/34 |
| 2018/0343605 A1* | 11/2018 | Wu | H04W 8/005 |

* cited by examiner

SELECTIVE MESSAGE RETRANSMISSION IN VEHICLE-VEHICLE COMMUNICATIONS

RELATED APPLICATIONS

This application is a § 371 application of PCT/IB2020/051017 filed Feb. 10, 2020, which claims priority from French Patent Application No. 19 01398 filed Feb. 12, 2019, each of which is incorporated herein by reference in its entirety.

FIELD OF THE INVENTION

The present invention relates to methods for communication of intention signaling messages between vehicles.

BACKGROUND OF THE INVENTION

In human driven vehicles, optical and sometimes audible signals are used to communicate intentions and status to surrounding traffic. For example, a human driver may activate turn signals indicating an intention to change lanes or change direction. Applying the brakes illuminates brake lights signaling an intended change in speed. Daytime running lights increase awareness of a vehicle's presence by surrounding drivers, as does the use of a horn in some specific situations. These types of signaling communicate intentions and allow surrounding traffic the opportunity to plan and adjust in advance, rather than only react to the currently observed situation.

It is important to note that human drivers do not fully rely on intent signaling by surrounding traffic in order to drive a vehicle, and are generally able to operate if signaling is omitted. However the signaling does greatly enhance safety and orderly flow of traffic, and if not performed diligently the likelihood of collisions greatly increases. For this reason, the signaling of intentions, as well as maintaining the signaling lights on a vehicle in good repair, is customarily required by law.

With the introduction of autonomous driving technology, electronic systems have been created to replicate the function of a human driver. Typically such systems rely on multitude of sensors such as RADAR, LIDAR, cameras, ultrasonic transducers and the like. Sophisticated computers perform complex calculations to assess the current situation and make decisions about controlling the vehicle. Such systems include augmented cruise control that is able to detect a car slowing down ahead (typically via RADAR) and apply the brakes to maintain a safe distance. More sophisticated fully autonomous systems have recently emerged that are able to analyze wider range of situations and perform a wider range of actions, including fully controlling a vehicle without human intervention.

However, currently known systems primarily function reactively, by observing past and current situation and making control decisions based on this information. Without knowledge of the intentions of the surrounding traffic, the control problem is made very difficult—just as it would be for human drivers. Signals intended for human drivers are typically optical and meant for human comprehension. It is very computationally intensive for an automated system to process multiple camera inputs simultaneously, detect optical signaling by other vehicles, and incorporate it into the control decision making.

A lot of theoretical and research work has been done in the art in the field of Vehicular Ad-hoc Networks (VANETS). This work has typically focused on dynamically configurable mobile networks providing full bidirectional communications between all participating vehicles, as well as data connections to stationary infrastructure, and the message routing protocols necessary to achieve these goals. Each vehicle is viewed as a single node in the network. The premise is that if a communication channel is established via the VANET, vehicles can then communicate their intentions and collaborate with each other.

In practice, VANET implementations have faced numerous and significant obstacles, and currently no commercial implementations exist. Key challenges include rapidly changing network topology, bandwidth limitations in high density traffic, signal obstructions by infrastructure and other vehicles, radio interference from external sources, security concerns and the like.

As stated above, VANET research and development in the art has focused on creating bi-directional links between nodes and delivering messages over multiple hops to specific recipients. However, the human intention signaling model shows that this is not necessary nor indeed desirable for facilitating efficient traffic flow. Simply providing a signal indicative of intended change in vehicle motion is sufficient to deliver significant improvements in safety and efficiency, provided such signal is reliably propagated to all affected surrounding traffic.

What is needed is an electronic intention signaling system that is simple to implement, robust, functional in both low density and high density traffic, not reliant on fixed infrastructure, and can integrate with both human driven and autonomous vehicles. The present invention sets forth such a system.

SUMMARY OF THE INVENTION

The terms "invention", "the invention", "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the detailed description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

A primary objective of the present invention is to provide a means of delivering signals indicative of intended change in vehicle motion to all surrounding traffic that may be affected by such change.

A second objective is to provide a means for limiting message propagation only to the traffic likely to be affected, so as to limit bandwidth congestion.

Knowing the direction from which a signal is coming is critical to being able to correctly process it. Human drivers inherently observe the direction by looking forward through the windshield, backward in the mirrors or to the sides.

In order to associate directionality with an electronic signal, the use of a plurality of directional antennas is necessary, each antenna being oriented in a predetermined direction. The signals received and transmitted by a directional antenna are then known to propagate in the direction associated with the antenna.

If a signal is received by more than one directional antenna, the relative signal strength and in some embodiments the difference in time of arrival observed between the two antennas can be used to further refine the direction from which the signal originated. Methods for doing so are well known and are outside the scope of the present invention. If such methods are utilized in a particular embodiment, increasing the number of antennas will generally increase the precision with which the direction of a signal can be determined.

Directional antennas are likewise well known in the field of radio communications, therefore their design and installation is outside the scope of the present invention. The methods of the present invention require that a plurality of directional antennas be installed on a vehicle in order to achieve the primary objective. Particular embodiments utilizing two and four antennas are illustrated herein. Numerous other configurations are possible and shall be readily apparent to those skilled in the art.

In dense traffic flow it is inevitable that some radio signals will be obstructed by the surrounding vehicles. This is particularly true for the high frequency, low power signals commonly used in modern data communications. Even for antennas mounted on the roof of a vehicle, signals will be obstructed in some directions by taller vehicles such as trucks, busses and the like.

Since the number of other vehicles that may be affected by one vehicle's intended change in motion is relatively small and confined to a finite area around the vehicle, it is desirable to limit transmissions to only the necessary recipients.

Therefore, to achieve the secondary objective, particular embodiments are illustrated with the plurality of directional antennas mounted low on the vehicle body, below the window line, for example within the conventional turn signal indicator units. Such placement results in signals only being visible to the immediately adjacent vehicles in the particular direction served by a particular antenna.

In dense traffic the surrounding vehicles will substantially block any further transmission of the original signal, thereby limiting interference with other transmissions. In sparse traffic interference may be limited in some embodiments by controlling transmission power and therefore range of the signals.

Further, the body of the vehicle the antennas are mounted on serves to enhance the directionality of signals by blocking signal propagation except in desired direction.

The methods of the present invention, by selectively retransmitting messages received on one directional antenna through one or more other directional antennas, serve to extend the effective range of the message propagation in the desired direction only. In addition to achieving its objectives, the present invention enables the use of signal blocking characteristics of vehicle bodies as an advantage rather than a disadvantage, which is a unique characteristic not found in conventional VANET approaches.

BRIEF DESCRIPTION OF THE DRAWINGS

The present invention is described herein with reference to the following drawings.

DETAILED DESCRIPTION OF THE EMBODIMENTS

Embodiments of the present invention require a plurality of directional antennas to be mounted on a vehicle. At least two antennas are necessary, however the exact number of antennas in a particular embodiments may vary without departing from the scope of the invention, as long as the number is at least 2. Directional antennas are well known in the art and their design and installation is outside the scope of the present invention.

Figure 1:
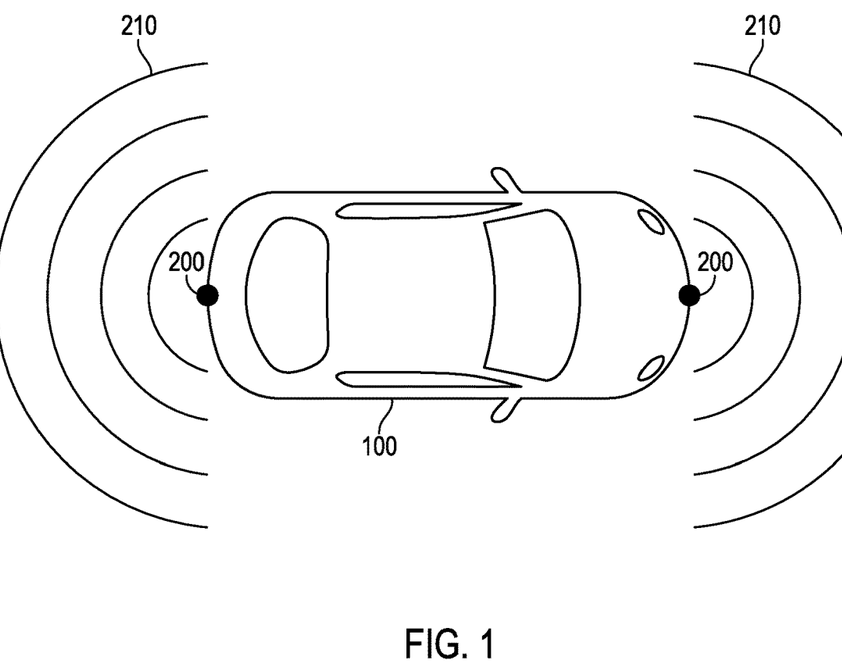
FIG. 1 is a top view diagram illustrating a vehicle with two directional antennas.

A vehicle configuration suitable for practicing the present invention with two directional antennas 200 mounted on vehicle 100 is illustrated in FIG. 1. The illustration also shows the respective propagation path for messages 210 transmitted by means of antennas 200.

Figure 2:
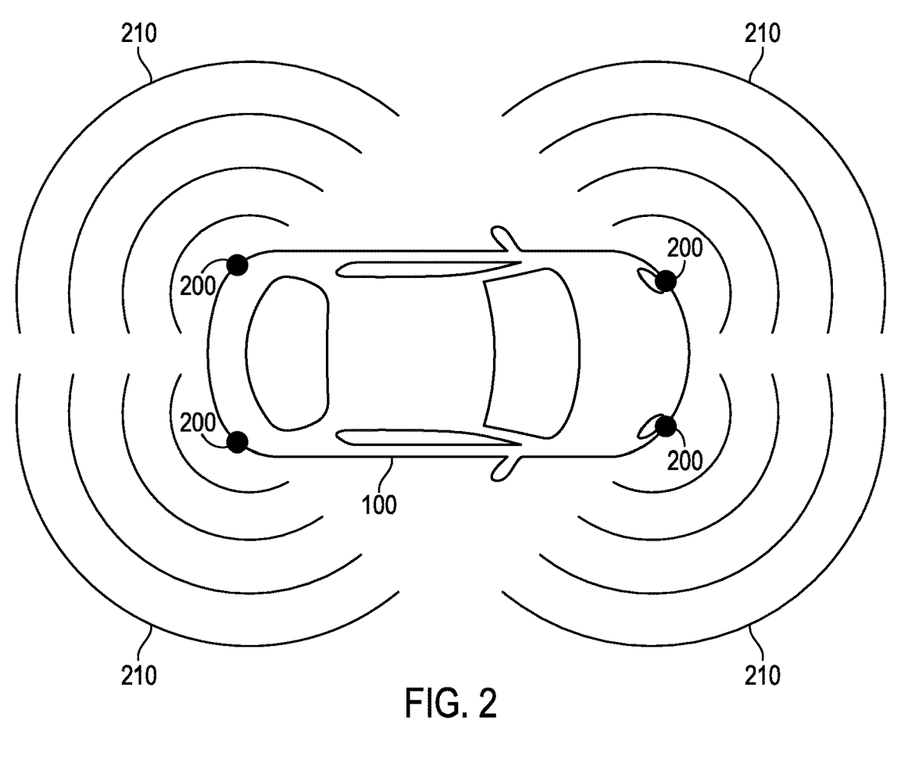
FIG. 2 is a top view diagram illustrating a vehicle with four directional antennas.
Figure 3:
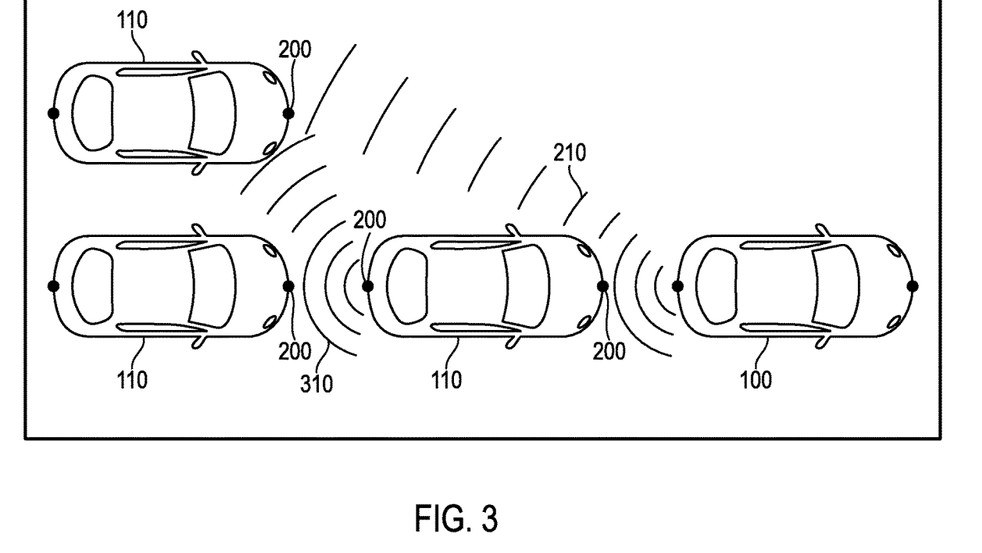
FIG. 3 illustrates message transmission and retransmission to traffic behind a vehicle having two directional antennas.
Figure 4:
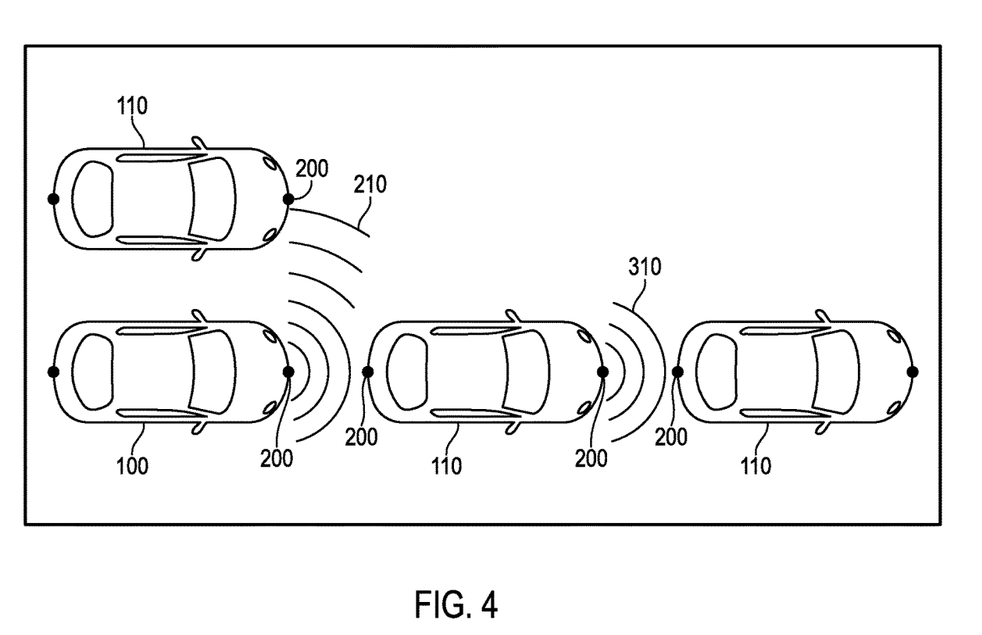
FIG. 4 illustrates message transmission and retransmission to traffic in front of a vehicle having two directional antennas.
Figure 5:
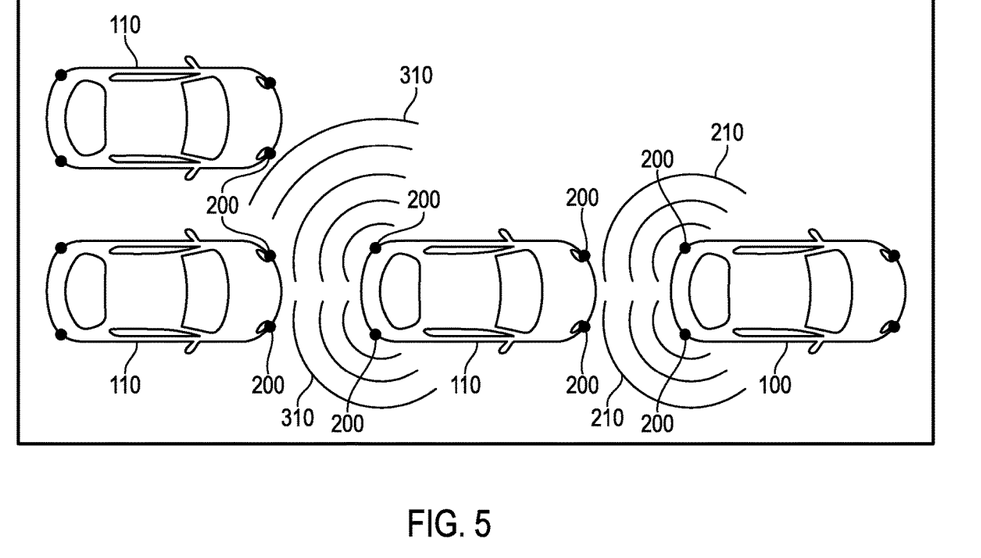
FIG. 5 illustrates message transmission and retransmission to traffic behind a vehicle having four directional antennas.
Figure 6:
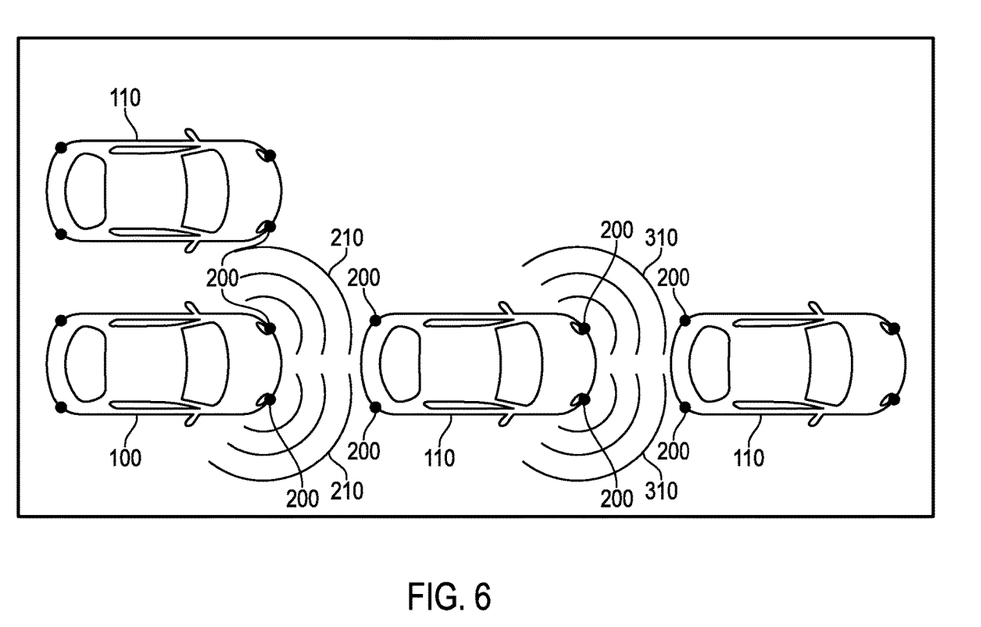
FIG. 6 illustrates message transmission and retransmission to traffic in front of a vehicle having four directional antennas.

A vehicle configuration with four directional antennas 200 mounted on vehicle 100 is illustrated in FIG. 2. The illustration shows the respective propagation path for messages 210 transmitted by means of antennas 200 in this configuration.

There are many different intended changes in motion that a vehicle may wish to signal to the surrounding traffic. Examples include acceleration, deceleration, lane changes, direction changes and the like. The nature of intended change, as well as current motion status of the vehicle, determines the direction in which surrounding traffic may be affected. For example, acceleration is likely to affect traffic in the forward direction. Deceleration is likely to affect traffic in the rearward direction. Lane changes may affect traffic both forward and rearward.

An intended change in motion may be initiated in response to human driver input, such as operating brakes, accelerator, steering, or turn signal indicators. An intended change may also be initiated by a vehicle's autonomous control system.

FIG. 3-6 illustrate the transmission of original messages 210 and repeat transmission of messages 310 in forward and rearward directions, by originating vehicle 100 and by repeating vehicle 110, utilizing vehicle configurations with two and four antennas.

Figure 7:
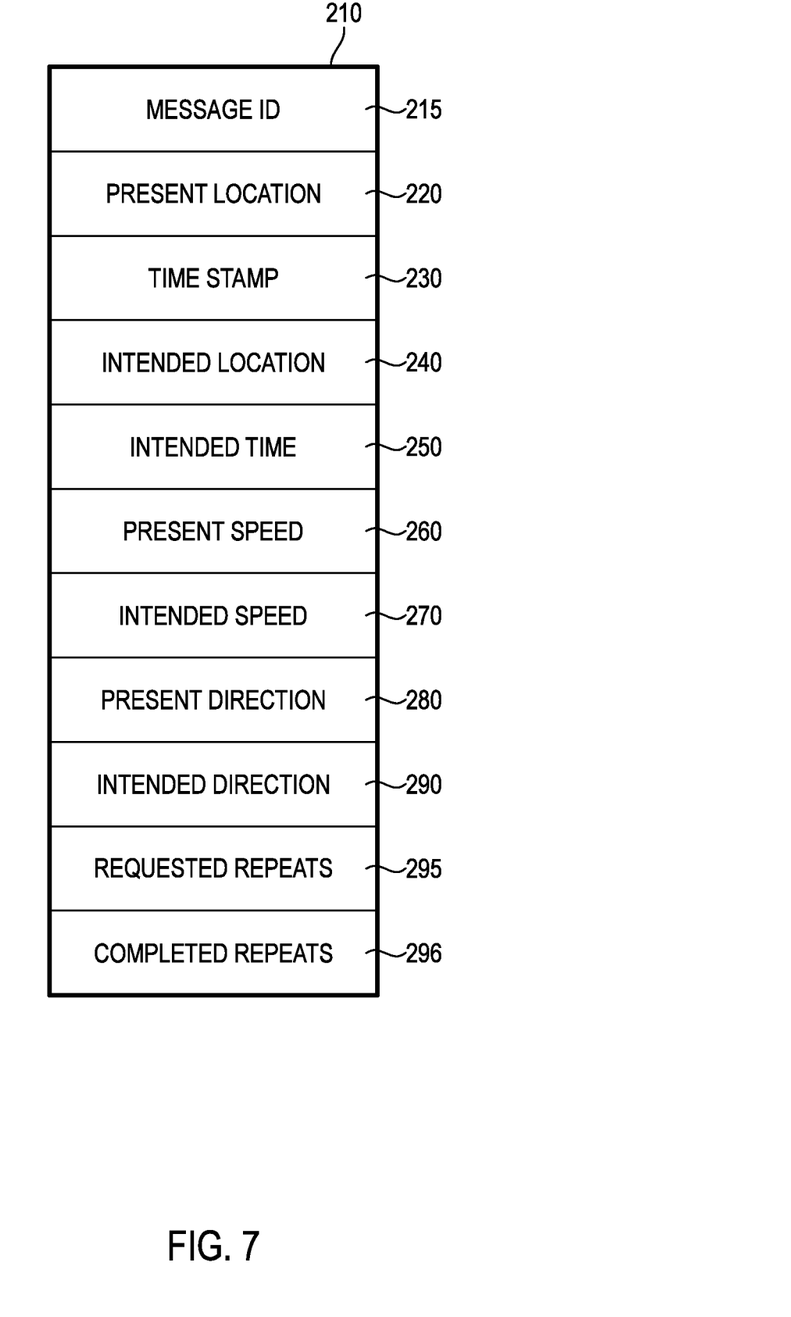
FIG. 7 is a block diagram showing typical content of a representative intention signaling message.

The typical content of a signaling message that may be utilized in some embodiments is illustrated in FIG. 7. A unique message ID 215 identifies the message. In some embodiments the message ID may comprise a unique vehicle ID and a message sequence number. If a receiving vehicle processes a message with a particular ID, and later receives a message repeated by another vehicle with the same message ID, the duplicate message can therefore be identified and discarded.

If the present location of the vehicle at the time the message is formed is known, it may be included in the present location field 220.

Time stamp 230 indicates the time at which the message was formed.

Intended location 240, if known, indicates to vehicles receiving the message the location where the originating vehicle 100 is expected to be upon completion of the intended change.

Intended time 250 is the time at which intended change is expected to be complete.

Some embodiments may also include additional information such as present speed 260, intended speed 270, present direction 280, intended direction 290, and other similar data.

In keeping with the secondary objective of the invention to limit the message propagation only to the surrounding traffic likely to be affected by the intended change, some embodiments may request a specific number of repeats. The particular number requested may depend on the present conditions, the magnitude of the intended change, and the direction in which the message is being sent.

For example, an intended lane change message may be sent in the rearward direction with a request of 2 repeats, and separately in the forward direction with a request of 0 repeats. A message indicating an emergency deceleration would be sent in the rearward direction with a high number of requested repeats, for instance 5 or more, whereas a message indicating mild deceleration may be sent in the rearward direction with only 1 requested repeat. The numbers listed herein are illustrative only. Particular embodiments may select particular number of requested repeats as deemed appropriate.

Other embodiments are possible using other means of limiting message propagation, such as those based on time expiration, distance from originating location and the like. Such embodiments remain within the scope of the present invention.

A vehicle receiving a message by means of one of its directional antennas 200 will examine the message content. The direction from which the message was received is associated with the receiving antenna. The vehicle must then decide whether to retransmit the message, and if yes then in what direction.

In embodiments utilizing repeat request strategy, a vehicle will modify the received message by incrementing the completed repeats field 296, creating a retransmit message 310. If the resulting value is greater than the requested repeats field 295 then the message is discarded. Otherwise the modified message 310 is transmitted in a direction substantially opposite to the direction from which it was received.

If a change in the receiving vehicle's own motion status is necessary responsive to the information received in message 210, such change may be initiated by its autonomous system or communicated by visual or audible indicators to a human driver.

A new message 210 may then be formed by the vehicle indicating the planned change and transmitted in accordance with the present invention.

Figure 8:
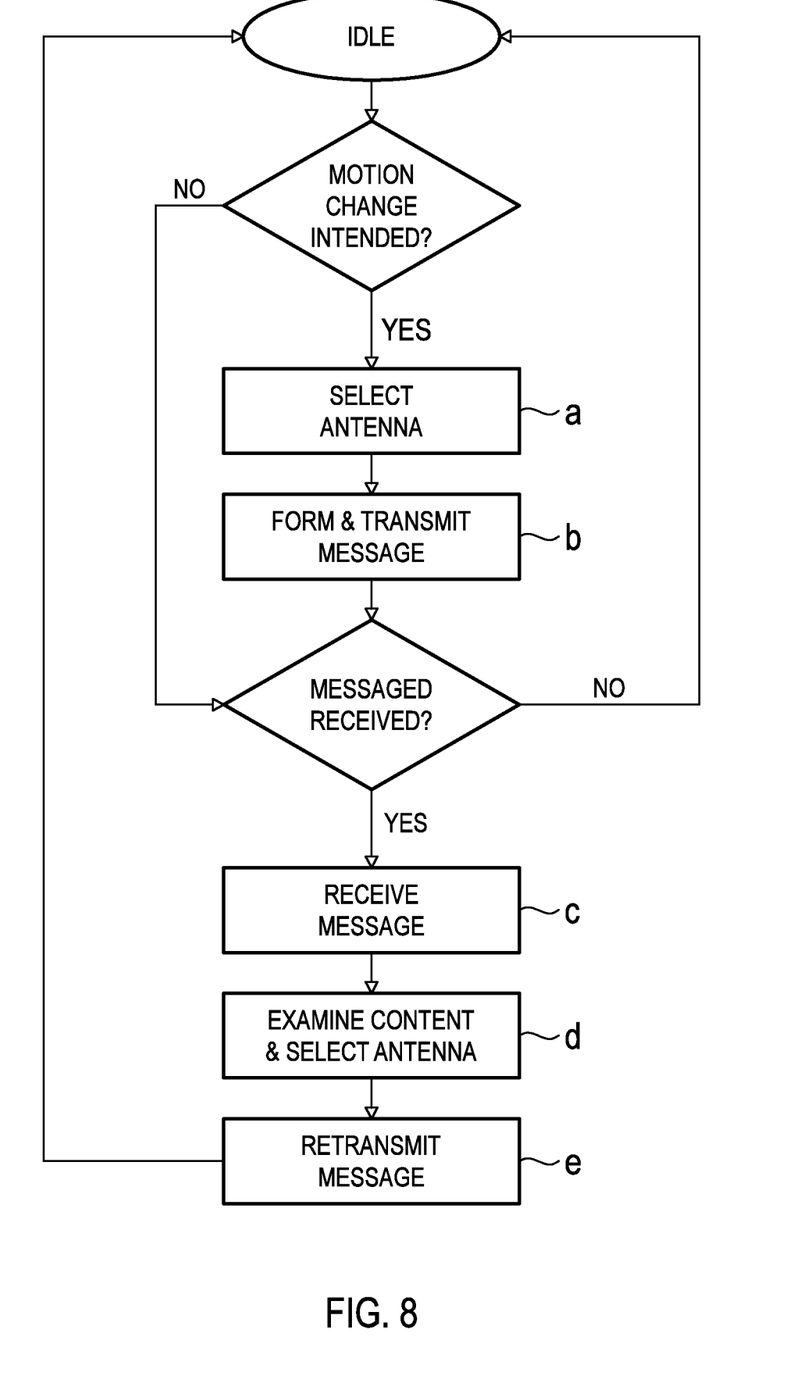
FIG. 8 is a flow diagram showing a method of the present invention.

As it can be seen in FIG. 8, the invention relates to a method of distributing intention signaling messages for a vehicle, said vehicle having a plurality of directional radio antennas oriented to transmit radio signals in predetermined and distinct directions, said method comprising the steps of:
 a. responsive to intended change in vehicle motion, selecting at least one of a plurality of directional radio antennas facing in the direction of surrounding traffic which would be affected by the intended change in motion; and
 b. forming and transmitting an intention signaling message corresponding to the intended change in vehicle motion by means of the directional radio antenna selected in step a.

According to a particular embodiment, the method further comprises the steps of:
 c. receiving by means of at least one of the plurality of directional radio antennas an intention signaling message from at least a second vehicle;
 d. examining the content of the message received in step c. to select at least one of directional radio antennas facing in the direction of surrounding traffic which would be affected by the intended change communicated in said received message; and
 e. transmitting the message received in step c. by means of the directional radio antenna selected in step d.

According to a particular embodiment, said forming of an intention signaling message in step b further comprises determining the desired number of repeat transmissions for the message.

According to a particular embodiment, said message received in step c contains information on requested number of repeat transmissions, and information on completed number of repeat transmissions. Examining the content of the received message in step d further comprises modifying the message content by incrementing the number of completed repeat transmissions by 1. Step e comprises transmitting the message modified in step d only if the requested number of repeat transmissions is greater than the completed number of repeat transmissions.

According to a particular embodiment, the method further comprises the steps of:
 f. determining an intention to effect a change in vehicle motion responsive to content of message received in step c;
 g. responsive to intended change in vehicle motion, selecting at least one of a plurality of directional radio antennas facing in the direction of surrounding traffic which would be affected by the intended change; and
 h. forming and transmitting an intention signaling message corresponding to the intended change in vehicle motion by means of the directional radio antenna selected in step g.

According to a particular embodiment, the forming of an intention signaling message further comprises incorporating current position information.

According to a particular embodiment, the forming of an intention signaling message further comprises incorporating intended future position information.

According to a particular embodiment, the forming of an intention signaling message further comprises information about the direction in which it is being transmitted.

According to a particular embodiment, said intended change in vehicle motion is initiated responsive to human driver input.

According to a particular embodiment, said intended change in vehicle motion is initiated autonomously by the vehicle.

According to a particular embodiment, determining the desired number of repeat transmissions is responsive to the magnitude of the intended change.

The particular embodiments disclosed herein are illustrative and not limiting; other embodiments shall be readily apparent to those skilled in the art based upon the disclosures made herein, without departing from the scope of the present invention.

The invention claimed is:

1. A method of distributing intention signaling messages for a vehicle, the vehicle comprising a plurality of directional radio antennas oriented to transmit radio signals in predetermined and distinct directions, the method comprising:
    responsive to an intended change in the vehicle motion, selection of at least first one of said plurality of directional radio antennas facing in a direction of surrounding traffic which would be affected by the intended change in the vehicle motion to provide a selected directional radio antenna;
    formation and transmission of the intention signaling message corresponding to the intended change in the vehicle motion by said at least first one of said plurality of directional radio antennas;
    reception of the intention signaling message from at least one other vehicle by at least second one of said plurality of directional radio antennas;
    examination of a content of the intention signaling message received from said at least one other vehicle to select said at least first one of said plurality of directional radio antennas facing in the direction of surrounding traffic which would be affected by the intended change communicated in the intention signaling message received; and
    transmission of the intention signaling message received by said at least first one of said plurality of directional radio antennas,
    wherein the intention signaling message received comprises information on a number of requested repeat transmissions and information on a number of completed repeat transmissions;
    wherein the examination of the content of the intention signaling message received comprises modifying the content by incrementing the number of completed repeat transmissions by one to provide a modified message; and
    wherein the transmission of the intention signaling message received comprises transmission of the modified message only if the number of requested repeat transmissions is greater than the number of completed repeat transmissions.

2. The method of claim 1, further comprising:
    determination of an intention to effect a change in the vehicle motion responsive to the content of the intention signaling message received from said at least one other vehicle;
    responsive to intended change of said at least one other vehicle, selection of said at least first one of said plurality of directional radio antennas facing in the direction of surrounding traffic which would be affected by the intended change of said at least one other vehicle; and
    transmission of the intention signaling message corresponding to the intended change of said at least one other vehicle by said at least first one of said plurality of directional radio antennas.

3. The method of claim 1, wherein the formation of the intention signaling message comprises incorporating current position information.

4. The method of claim 1, wherein the formation of the intention signaling message comprises incorporating intended future position information.

5. The method of claim 1, wherein the formation the intention signaling message comprises information about a transmission direction of the intention signaling message.

6. The method of claim 1, wherein the intended change in vehicle motion is initiated responsive to a human driver input.

7. The method of claim 1, wherein the intended change in vehicle motion is initiated autonomously by the vehicle.

8. The method of claim 1, wherein the formation of the intention signaling message comprises determination of a desired number of repeat transmissions for the intentional signaling message.

9. A method of distributing intention signaling messages for a vehicle, the vehicle comprising a plurality of directional radio antennas oriented to transmit radio signals in predetermined and distinct directions, the method comprising:
    responsive to an intended change in the vehicle motion, selection of at least first one of said plurality of directional radio antennas facing in a direction of surrounding traffic which would be affected by the intended change in the vehicle motion to provide a selected directional radio antenna, and
    formation and transmission of the intention signaling message corresponding to the intended change in the vehicle motion by said at least first one of said plurality of directional radio antennas,
    wherein the formation of the intention signaling message comprises determination of a desired number of repeat transmissions for the intentional signaling message, and
    wherein determination of the desired number of repeat transmissions is in accordance with a magnitude of the intended change in the vehicle motion.

10. The method of claim 9, further comprising:
    reception of the intention signaling message from at least one other vehicle by at least second one of said plurality of directional radio antennas;
    examination of a content of the intention signaling message received from said at least one other vehicle to select said at least first one of said plurality of directional radio antennas facing in the direction of surrounding traffic which would be affected by the intended change communicated in the intention signaling message received; and
    transmission of the intention signaling message received by said at least first one of said plurality of directional radio antennas.

11. The method of claim 9, further comprising:
    determination of an intention to effect a change in the vehicle motion responsive to the content of the intention signaling message received from at least one other vehicle;
    responsive to intended change of said at least one other vehicle, selection of said at least first one of said plurality of directional radio antennas facing in the direction of surrounding traffic which would be affected by the intended change of said at least one other vehicle; and
    transmission of the intention signaling message corresponding to the intended change of said at least one other vehicle by said at least first one of said plurality of directional radio antennas.

12. The method of claim 9, wherein the formation of the intention signaling message comprises incorporating current position information.

13. The method of claim 9, wherein the formation of the intention signaling message comprises incorporating intended future position information.

14. The method of claim 9, wherein the formation the intention signaling message comprises information about a transmission direction of the intention signaling message.

15. The method of claim 9, wherein the intended change in vehicle motion is initiated responsive to a human driver input.

16. The method of claim 9, wherein the intended change in vehicle motion is initiated autonomously by the vehicle.

* * * * *